US009815267B2

(12) United States Patent
Hofmann et al.

(10) Patent No.: US 9,815,267 B2
(45) Date of Patent: Nov. 14, 2017

(54) METHOD FOR FORMING A UNITARY CONTROL PANEL FOR AN APPLIANCE

(71) Applicant: General Electric Company, Schenectady, NY (US)

(72) Inventors: Adam Christopher Hofmann, Louisville, KY (US); Ramasamy Thiyagarajan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 411 days.

(21) Appl. No.: 14/678,018

(22) Filed: Apr. 3, 2015

(65) Prior Publication Data

US 2016/0288418 A1   Oct. 6, 2016

(51) Int. Cl.
*B33Y 10/00* (2015.01)
*B22F 3/105* (2006.01)
*B23K 11/00* (2006.01)
*B29C 64/165* (2017.01)
*B22F 5/10* (2006.01)
*B22F 7/06* (2006.01)
*B33Y 50/02* (2015.01)
*B33Y 80/00* (2015.01)
*B29L 31/34* (2006.01)
*B22F 5/00* (2006.01)

(52) U.S. Cl.
CPC ............ *B33Y 10/00* (2014.12); *B22F 3/1055* (2013.01); *B22F 5/10* (2013.01); *B22F 7/06* (2013.01); *B23K 11/0013* (2013.01); *B29C 64/165* (2017.08); *B22F 2005/005* (2013.01); *B29L 2031/3481* (2013.01); *B33Y 50/02* (2014.12); *B33Y 80/00* (2014.12); *Y02P 10/295* (2015.11)

(58) Field of Classification Search
CPC ......... B33Y 10/00; B33Y 50/00; B33Y 50/02; B33Y 80/00; B22F 2005/005; B22F 3/00; B22F 3/105; B22F 3/1055; B22F 5/00; B22F 5/10; B22F 7/06; B29L 2031/3481; B29C 67/00; B29C 67/0081
See application file for complete search history.

(56) References Cited

U.S. PATENT DOCUMENTS

| | | | | |
|---|---|---|---|---|
| 5,776,409 | A | * | 7/1998 | Almquist ................ B29C 64/40 118/407 |
| 6,158,346 | A | * | 12/2000 | Zhang ................... B29C 64/153 101/489 |
| 8,178,802 | B2 | | 5/2012 | Roose et al. |
| 8,592,519 | B2 | | 11/2013 | Martinoni |
| 8,804,346 | B2 | | 8/2014 | Moncrieff |

(Continued)

OTHER PUBLICATIONS

Leigh et al. Simple Low-Cost Conductive Composite Material for 3D Printing of Electronic Sensors Nov. 21, 2012 PLoS ONE 7(11): e49365 doi:10.1371/journal.pone.0049365.*

*Primary Examiner* — Jennifer A Smith
*Assistant Examiner* — Alexandra M Moore
(74) *Attorney, Agent, or Firm* — Dority & Manning, P.A.

(57) ABSTRACT

A method for forming a unitary control panel for an appliance is provided. The method includes establishing three-dimensional information of the unitary control panel, converting the three-dimensional information of the unitary control panel into a plurality of slices, and successively forming or additively constructing each cross-sectional layer of the unitary control panel.

19 Claims, 5 Drawing Sheets

(56) References Cited

U.S. PATENT DOCUMENTS

| | | | |
|---|---|---|---|
| 2007/0045281 A1* | 3/2007 | Baier | D06F 39/005 219/483 |
| 2011/0057899 A1* | 3/2011 | Sleeman | G01L 1/146 345/174 |
| 2015/0197063 A1* | 7/2015 | Shinar | G06F 17/50 700/98 |

* cited by examiner

METHOD FOR FORMING A UNITARY CONTROL PANEL FOR AN APPLIANCE

FIELD OF THE INVENTION

The present subject matter relates generally to control panels for appliances.

BACKGROUND OF THE INVENTION

Appliances generally include a control panel with user inputs for regulating operation of the appliance. Various user inputs are available for appliances. For example, buttons, switches, touch sensors and combinations of such user inputs may be provided on a control panel in order to provide a user with control of an associated appliance. Recently, tactile inputs have become more popular. Certain consumers prefer the feel of tactile inputs compared to alternative user inputs due to the feedback provided by tactile inputs. Despite their popularity, manufacturing tactile inputs for appliances and using tactile inputs in appliances poses certain challenges.

Certain current tactile inputs are produced by laminating various layers of plastic together. Thus, such current tactile inputs are a compilation of multiple parts with many failure modes, including adhesion, delamination, incorrectly positioned components, etc. In particular, dishwasher appliances may include a vent where steam and other heated fluids exit a wash chamber of the dishwasher appliance, and a control panel of the dishwasher appliance may positioned directly over the vent. Over time, expansion and contraction of the control panel caused by heating of the control panel by the fluids exiting the vent can cause the components of the control panel to separate and/or delaminate.

Accordingly, a method for forming a control panel for an appliance that includes tactile inputs would be useful. In particular, a method for forming a control panel for an appliance that includes tactile inputs with features for hindering or preventing separation of tactile input components would by useful.

BRIEF DESCRIPTION OF THE INVENTION

The present subject matter provides a method for forming a unitary control panel for an appliance. The method includes establishing three-dimensional information of the unitary control panel, converting the three-dimensional information of the unitary control panel into a plurality of slices, and successively forming or additively constructing each cross-sectional layer of the unitary control panel. Additional aspects and advantages of the invention will be set forth in part in the following description, or may be apparent from the description, or may be learned through practice of the invention.

In a first exemplary embodiment, a method for forming a unitary control panel for an appliance is provided. The method includes establishing three-dimensional information of the unitary control panel and converting the three-dimensional information of the unitary control panel from the step of establishing into a plurality of slices. Each slice of the plurality of slices defines a respective cross-sectional layer of the unitary control panel. The method also includes successively forming each cross-sectional layer of the unitary control panel with an additive process. After the step of successively forming, the unitary control panel includes: (1) a base defining a plurality of slots; (2) a conductive trace disposed within the base; (3) a plurality of elastically deformable conductive contacts fixed to the base with each elastically deformable conductive contact disposed within a respective one of the plurality of slots of the base; and (4) a plurality of buttons positioned at the base with each button having a respective graphic and mounted to a respective one of the plurality of elastically deformable conductive contacts.

In a second exemplary embodiment, a method for forming a unitary control panel for an appliance is provided. The method includes establishing three-dimensional information of a base and a plurality of elastically deformable conductive contacts of the unitary control panel, converting the three-dimensional information from the step of establishing into a plurality of slices, and additively constructing each slice of the base of the unitary control panel. The method also includes integrally forming, during the step of additively constructing, each slice of the plurality of elastically deformable conductive contacts. Each elastically deformable conductive contact has a button with a respective graphic after the step of integrally forming.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
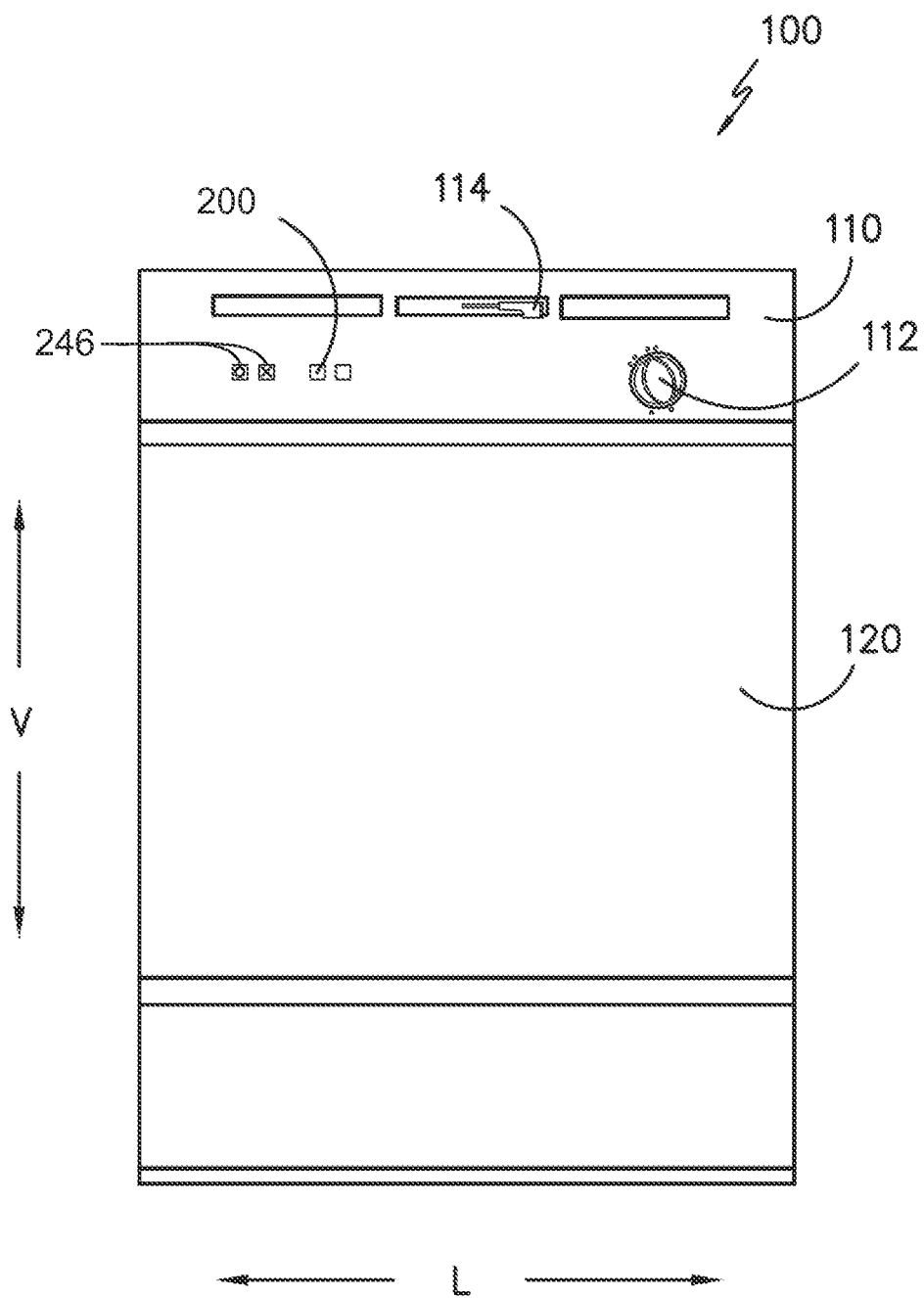
FIG. 1 provides a front elevation view of a dishwasher appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
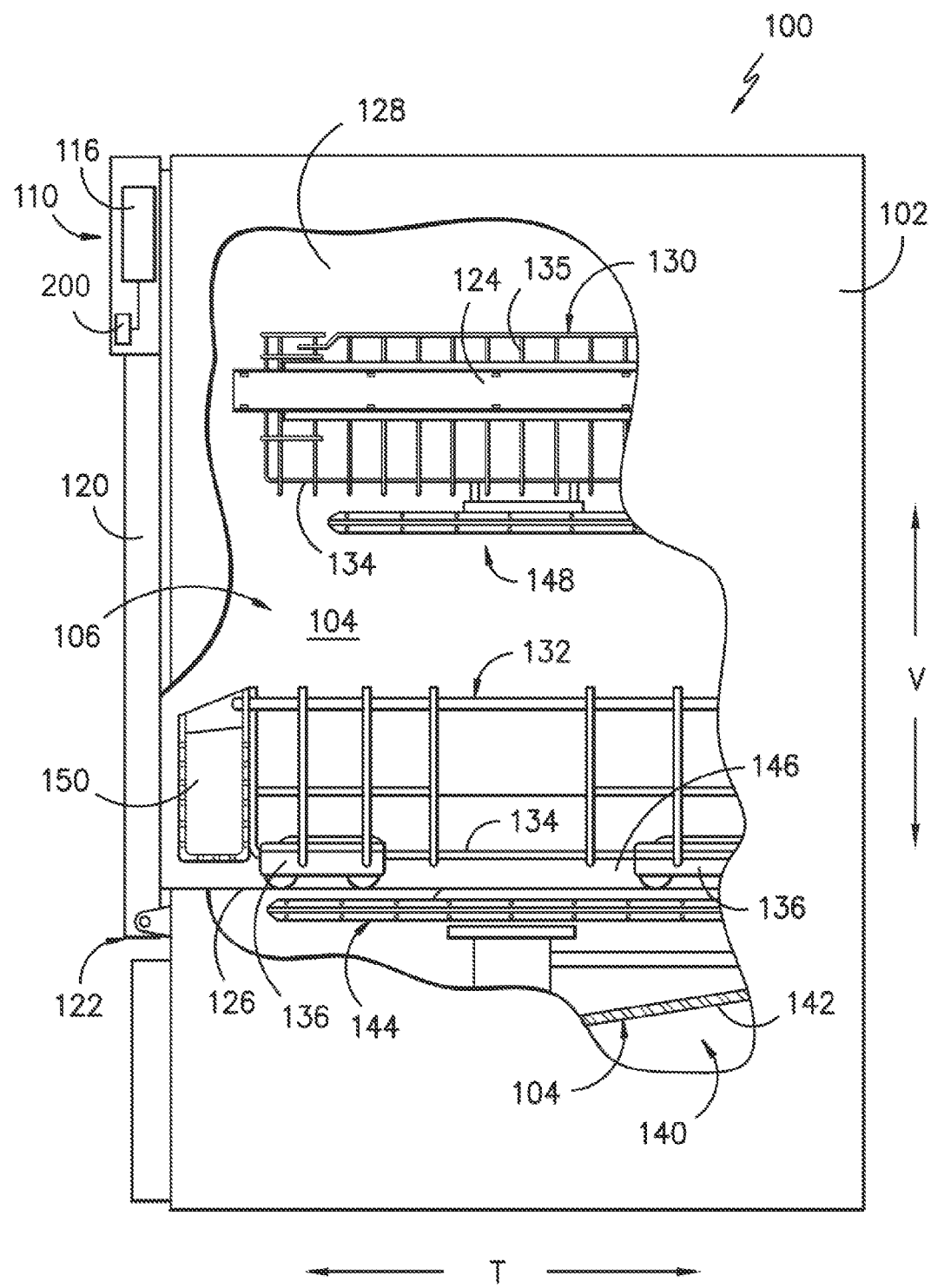
FIG. 2 provides a partial side section view of the exemplary dishwasher appliance of FIG. 1.

FIGS. 1 and 2 depict a dishwasher appliance 100 according to an exemplary embodiment of the present subject matter. Dishwasher appliance 100 defines a vertical direction V, a lateral direction L (FIG. 1) and a transverse direction T (FIG. 2). The vertical, lateral, and transverse directions V, L, and T are mutually perpendicular and form an orthogonal direction system.

Dishwasher appliance 100 includes a chassis or cabinet 102 having a tub 104. Tub 104 defines a wash chamber 106 and includes a front opening (not shown) and a door 120 hinged at its bottom 122 for movement between a normally closed vertical position (shown in FIGS. 1 and 2), wherein wash chamber 106 is sealed shut for washing operation, and a horizontal open position for loading and unloading of articles from dishwasher appliance 100. A latch 114 is used to lock and unlock door 120 for access to chamber 106.

Slide assemblies 124 are mounted on opposing tub sidewalls 128 to support and provide for movement of an upper rack assembly 130. Lower guides 126 are positioned in opposing manner of the sides of chamber 106 and provide a ridge or shelf for roller assemblies 136 so as to support and provide for movement of a lower rack assembly 132. Each of the upper and lower rack assemblies 130 and 132 is fabricated into lattice structures including a plurality of elongated members 134 and 135 that extend in lateral (L), transverse (T), and/or vertical (V) directions. Each rack assembly 130, 132 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by slide assemblies 124 and roller assemblies 136 that carry the upper and lower rack assemblies 130 and 132, respectively. A silverware basket 150 may be removably attached to the lower rack assembly 132 for placement of silverware, small utensils, and the like, that are too small to be accommodated by the upper and lower rack assemblies 130, 132.

Dishwasher appliance 100 also includes a lower spray assembly 144 that is rotatably mounted within a lower region 146 of the wash chamber 106 and above a tub sump portion 142 so as to rotate in relatively close proximity to lower rack assembly 132. A spray arm or mid-level spray assembly 148 is located in an upper region of the wash chamber 106 and may be located in close proximity to upper rack assembly 130. Additionally, an upper spray assembly (not shown) may be located above the upper rack assembly 130 and mounted to an upper wall of tub 104.

Lower and mid-level spray assemblies 144, 148 and the upper spray assembly are fed by a fluid circulation assembly for circulating water and wash fluid in the tub 104. Portions of the fluid circulation assembly may be located in a machinery compartment 140 located below tub sump portion 142 of tub 104, as generally recognized in the art. Each spray assembly includes an arrangement of discharge ports or orifices for directing washing liquid onto dishes or other articles located in upper and lower rack assemblies 130, 132, respectively. The arrangement of the discharge ports in at least the lower spray assembly 144 provides a rotational force by virtue of washing fluid flowing through the discharge ports. The resultant rotation of lower spray assembly 144 provides coverage of dishes and other articles with a washing spray.

Dishwasher appliance 100 is further equipped with a controller 116 to regulate operation of dishwasher appliance 100. Controller 116 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 116 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 116 may be positioned in a variety of locations throughout dishwasher appliance 100. In the illustrated embodiment, controller 116 may be located within a control panel area 110 of door 120 as shown. In such an embodiment, input/output ("I/O") signals may be routed between the control system and various operational components of dishwasher appliance 100 along wiring harnesses that may be routed through bottom 122 of door 120. Typically, the controller 116 includes a user interface panel or control panel 200 through which a user may select various operational features and modes and monitor progress of the dishwasher appliance 100. In one embodiment, control panel 200 may represent a general purpose I/O ("GPIO") device or functional block. In one embodiment, the control panel 200 may include input components, such as one or more of a variety of electrical, mechanical or electro-mechanical input devices including rotary dials, push buttons, and touch pads, as discussed in greater detail below. Control panel 200 may include a display component, such as a digital or analog display device designed to provide operational feedback to a user. Control panel 200 may be in communication with controller 116 via one or more signal lines or shared communication busses.

It should be appreciated that the present subject matter is not limited to any particular style, model, or configuration of dishwasher appliance. Thus, the exemplary embodiment depicted in FIGS. 1 and 2 is provided for illustrative purposes only. For example, different locations may be provided for a user interface 112, different configurations may be provided for upper and lower rack assemblies 130, 132 and/or lower and mid-level spray assemblies 144, 148, and other differences may be applied as well.

Figure 3:
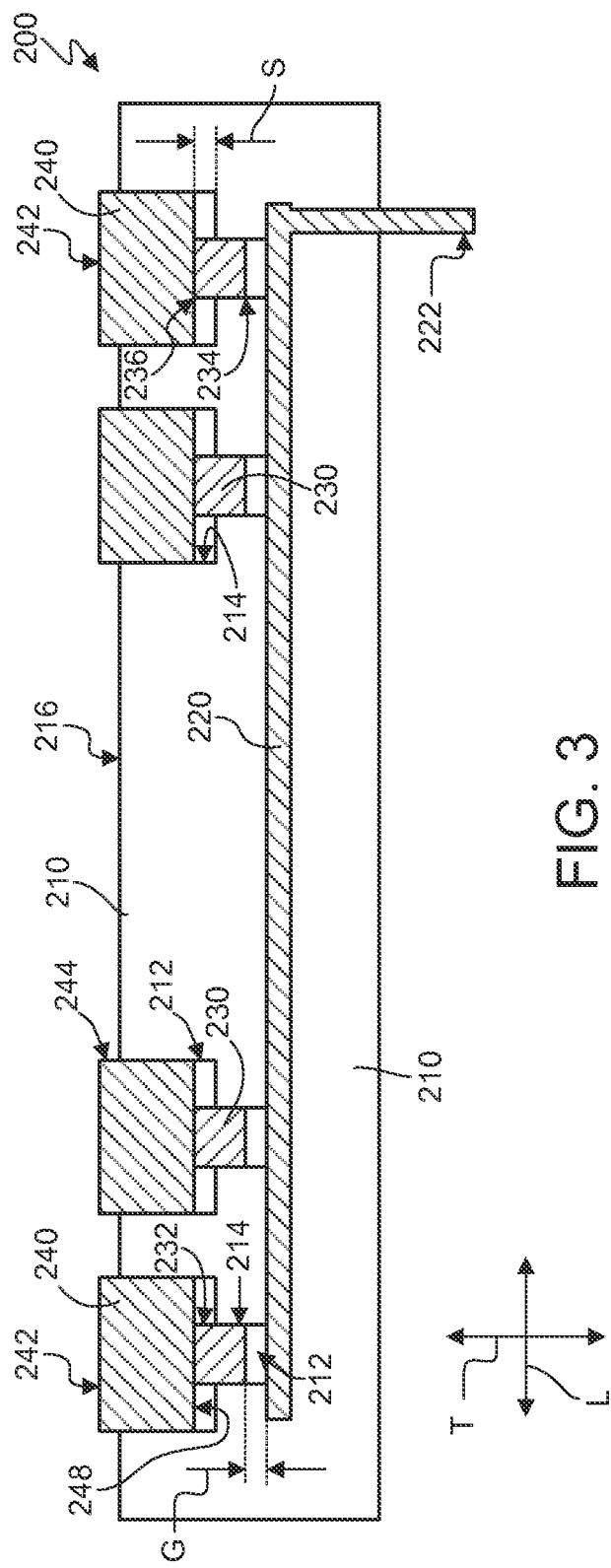
FIGS. 3 and 4 provide section views of a control panel of the exemplary dishwasher appliance of FIG. 1.
Figure 4:
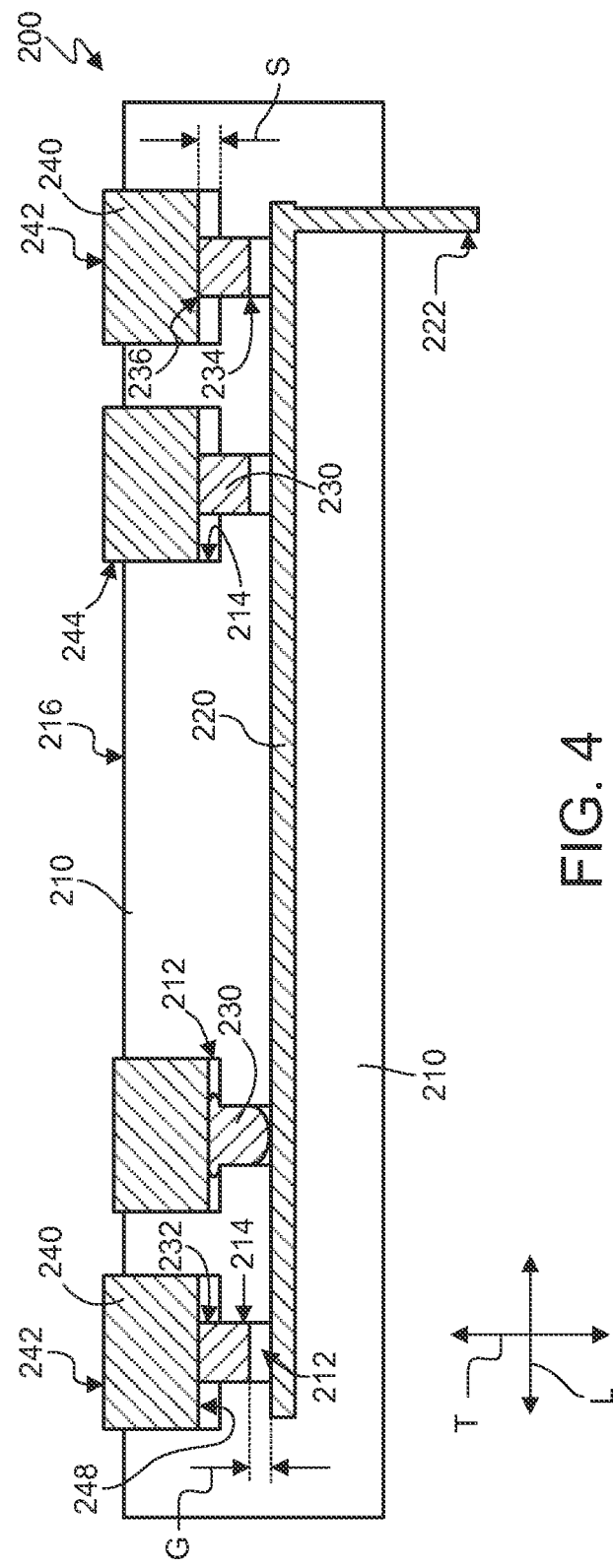

FIGS. 3 and 4 provide section views of control panel 200 of dishwasher appliance 100. It should be understood that while discussed in the context of dishwasher appliance 100, control panel 200 may be used within any suitable appliance, such as a refrigerator appliance, a washing machine appliance, a dryer appliance, etc. As discussed in greater detail below, control panel 200 includes features for allowing a user of dishwasher appliance 100 to input commands to controller 116.

As may be seen in FIGS. 3 and 4, control panel 200 includes a base 210. Base 210 defines a plurality of slots 212, e.g., that extend into base 210 along the transverse direction T. Slots 212 may be spaced apart from each other, e.g., along the lateral direction L, within base 210. Base 210 may be constructed of or with any suitable material. For example, base 210 may be constructed of or with a rigid plastic, such as polystyrene, polypropylene, etc. Base 210 may be mounted to door 120 of dishwasher appliance 100, e.g., at or within control panel area 110 of door 120. A conductive trace 220 is disposed or encased within base 210, Conductive trace 220 may be coupled to wiring at an end 222 of conductive trace 220, e.g., in order to allow signals from control panel 200 to be transmitted or sent to controller 116.

Control panel 200 also includes a plurality of elastically deformable conductive contacts 230. Contacts 230 are fixed to base 210. For example, each contact of contacts 230 may disposed within a respective one of slots 212 of base 210, and at least a portion of an outer surface 232 of each contact of contacts 230 may be fixed or integrally formed with base 210 at an inner surface 214 of the respective one of slots 212. Thus, contacts 230 may be statically mounted to base 210 at outer surface 232 of each contact of contacts 230. However, contacts 230 are elastically deformable and may be compressed or otherwise elastically deformed in order to contact conductive trace 220 within base 210, as discussed in greater detail below.

Contacts 230 may be formed of or with any suitable material or combination of materials. For example, contacts 230 may be formed of a metal and an elastomer mixture, e.g., such that the metal of contacts 230 ensures that contacts 230 have sufficient conductivity and the elastomer of contacts 230 ensures that contacts 230 have sufficient elasticity. The metal of contacts 230 may be copper, aluminum, gold, etc., and the elastomer of contacts 230 may be ethylene propylene rubber, nitrile rubber, styrene-butadiene, butyl rubber, polybutadiene, etc.

Control panel 200 further includes a plurality of buttons 240. Buttons 240 are positioned at base 210 and are each fixed or integrally formed with a respective one of contacts 230. For example, each contact of contacts 230 extends between a first end portion 234 and a second end portion 236, e.g., along the transverse direction T. Buttons 240 may each be fixed or integrally formed with the respective one of contacts 230 at second end portion 236 of contacts 230. First end portion 234 of contacts 230 may be spaced apart from second end portion 236 of contacts 230, e.g., along the transverse direction T, and may be positioned adjacent and face conductive trace 220 within base 210.

Each button of buttons 240 may also be positioned within a respective one of slots 212 of base 210. In particular, each button of buttons 240 may have a sidewall 244 that is positioned adjacent and faces the inner surface 214 of the respective one of slots 212. The sidewall 244 of each button of buttons 240 is not fixed to or integrally formed with the inner surface 214 of the respective one of slots 212. Thus, buttons 240 may be depressed into base 210 such that buttons 240 move, e.g., along the transverse direction T, relative to base 210.

Buttons 240 are selectively movable between an extended configuration and a depressed configuration. As an example, a user of control panel 200 may selectively adjust buttons 240 between the extended and depressed configuration by pushing buttons 240 towards and/or into base 210, e.g., along the transverse direction T. In turn, when the user of control panel 200 stops pressing buttons 240, contacts 230 return to their original shape and urge buttons 240 back to the extended configuration.

In FIG. 3, all of buttons 240 are shown in the extended configuration. Conversely, one of buttons 240 is shown in the depressed configuration in FIG. 4. As shown in FIG. 3, the first end portion 234 of contacts 230 is spaced apart from conductive trace 220 by a gap G, e.g., along the transverse direction T, in the extended configuration such that contacts 230 do not touch conductive trace 220. Conversely, in the depressed configuration, movement of button 240 towards base 210 deforms contact 230 such that the first end portion 234 of contacts 230 touches conductive trace 220, as shown in FIG. 4. When buttons 240 are in in the depressed configuration, control panel 200 may send a signal to controller 116 via conductive trace 220 and/or other suitable wiring or busses, and controller 116 may take actions or initiate operations associated with such signal, as will be understood by those skilled in the art. A space S defined between a bottom surface 248 of buttons 240 (e.g., positioned opposite outer surface 242 of buttons 240) and base 210 along the transverse direction T may permit movement of buttons 240 from the extend configuration into base 210 to the depressed configuration. A depth of the space S along the transverse direction T may about (e.g., within ten percent of) equal to a depth of the gap G along the transverse direction T.

Each button of buttons 240 may be associated with a particular input or command of control panel 200. Thus, each button of buttons 240 may have a respective visual indicator or graphic 246 (shown in FIG. 1) positioned thereon that indicates the input or function associated with buttons 240. Graphics 246 may be positioned on or at outer surfaces 242 of buttons 240. Graphics 246 may be integrally formed by material of buttons 240, e.g., rather than adhered to outer surfaces 242 of buttons 240. For example, buttons 240 may be formed of at least two materials each having a different color, and one of the materials may form the shape of graphics 246 at or on outer surfaces 242 of buttons 240. Each graphic of graphics 246 may be different or unique, as will be understood by those skilled in the art. Integrally forming graphics 246 with buttons 240 may assist with preventing or limiting delamination, abrasion or other removal of graphics 246 from buttons 240.

Buttons 240 may be constructed of or with any suitable material. For example, buttons 240 may be constructed of or with a rigid plastic or combination of rigid plastics, such as polystyrene, polypropylene, etc. Base 210 and buttons 240 may share at least one common material, in certain exemplary embodiments. In particular, base 210 and buttons 240 may be constructed of or with the same type of rigid plastic or combination of rigid plastics, in certain exemplary embodiments.

As discussed above, buttons 240 have outer surfaces 242. As may be seen in FIGS. 3 and 4, base 210 also defines an outer surface 216. Outer surface 216 of base 210 may face away from wash chamber 106 of tub 104 and be positioned at or adjacent door 120. Thus, control panel 200 may be mounted to door 120 at or adjacent outer surface 216 of base 210. Outer surfaces 242 of buttons 240 may be positioned such that outer surfaces 242 of buttons 240 are raised or spaced apart from outer surface 216 of base 210, e.g., along the transverse direction T when buttons 240 are in the extended configuration, as shown in FIG. 3. Such positioning of outer surfaces 242 of buttons 240 relative to outer surface 216 of base 210 may permit buttons 240 to extend through an outer panel of door 120.

As discussed above, contacts 230 may be fixed or integrally formed with base 210, and buttons 240 may be fixed or integrally formed with contacts 230. Such mounting of contacts 230 to base 210 and buttons 240 to contacts 230 may permit construction of control panel 200 (or certain component of control panel 200) without adhesive. In particular, contacts 230 may be mounted to base 210 and buttons 240 may be mounted to contacts 230 without a separate adhesive. In such a manner, delamination or other connection failures between components of control panel 200 may be prevented or limited.

Figure 5:
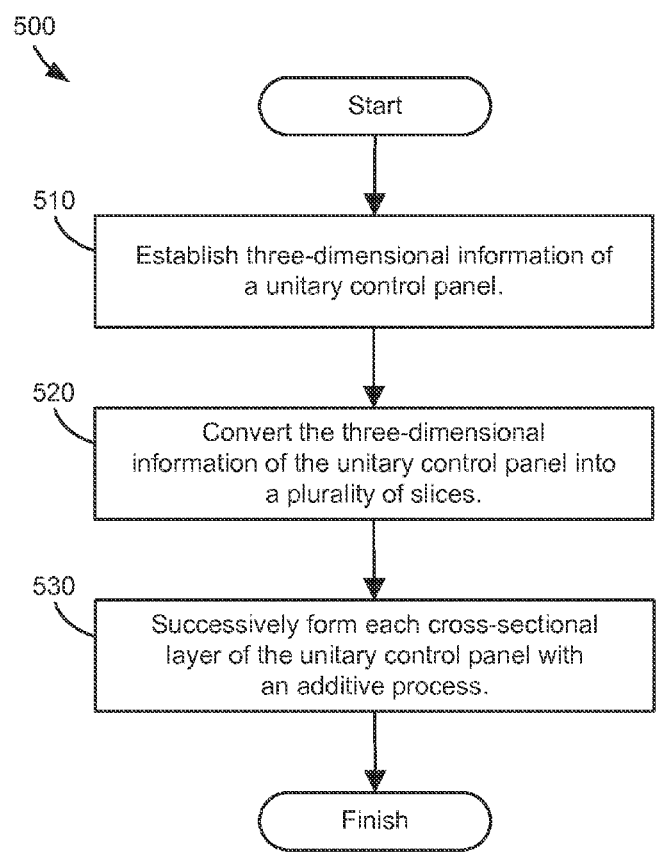
FIG. 5 illustrates a method for forming a unitary control panel for an appliance according to an exemplary embodiment of the present subject matter.

FIG. 5 illustrates a method for forming a unitary control panel for an appliance according to an exemplary embodiment of the present subject matter. Method 500 may be used to form any suitable control panel. For example, method 500 may be used to form control panel 200 (FIGS. 3 and 4). Method 500 permits formation of various features of control panel 200, as discussed in greater detail below. Method 500 includes fabricating control panel 200 as a unitary control panel, e.g., such that control panel 200 is formed of a continuous piece of plastic, metal or other suitable material or combination of materials that are integrally formed together. More particularly, method 500 includes manufacturing or forming control panel 200 using an additive process, such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering and other known processes. An additive process fabricates plastic or metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, at step 510, three-dimensional information of control panel 200 is determined. As an example, a model or prototype of control panel 200 may be scanned to determine the three-dimensional information of control panel 200 at step 510. As another example, a model of control panel 200 may be constructed using a suitable CAD program to determine the three-dimensional information of control panel 200 at step 510. At step 520, the three-dimensional information is converted into a plurality of slices that each defines a cross-sectional layer of control panel 200. As an example, the three-dimensional information from step 510 may be divided into equal sections or segments, e.g., along a central axis of control panel 200 or any other suitable axis. Thus, the three-dimensional information from step 510 may be discretized at step 520, e.g., in order to provide planar cross-sectional layers of control panel 200.

After step 520, control panel 200 is fabricated using the additive process, or more specifically each layer is successively formed at step 530, e.g., by fusing or polymerizing a plastic using laser energy or heat. The layers may have any suitable size. For example, each layer may have a size between about five ten-thousandths of an inch and about one thousandths of an inch. Control panel 200 may be fabricated using any suitable additive manufacturing machine as step 530. For example, any suitable laser sintering machine, inkjet printer or laserjet printer may be used at step 530.

Utilizing method 500, control panel 200 may have fewer components and/or joints than known control panels. Specifically, control panel 200 may require fewer components because control panel 200 may be a single piece of continuous plastic and/or metal, e.g., rather than multiple pieces of material joined or connected together with adhesive. In particular, method 500 may form control panel 200 such that contacts 230 are mounted to base 210 and buttons 240 are mounted to contacts 230 without an adhesive. In addition, method 500 may permit each button of buttons 240 to be formed with the proper graphic 246, e.g., without requiring a worker or machine to properly position or apply graphic 246 to a correct one of buttons 240.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a unitary control panel for an appliance, comprising:
    establishing three-dimensional information of the unitary control panel;
    converting the three-dimensional information of the unitary control panel from said step of establishing into a plurality of slices, each slice of the plurality of slices defining a respective cross-sectional layer of the unitary control panel; and
    successively forming each cross-sectional layer of the unitary control panel with an additive process;
    wherein, after said step of successively forming, the unitary control panel includes: (1) a base defining a plurality of slots; (2) a conductive trace disposed within the base; (3) a plurality of elastically deformable conductive contacts fixed to the base with each elastically deformable conductive contact disposed within a respective one of the plurality of slots of the base; and (4) a plurality of buttons positioned at the base with each button having a respective graphic and mounted to a respective one of the plurality of elastically deformable conductive contacts.

2. The method of claim 1, wherein the additive process comprises at least one of fused deposition modeling, selective laser sintering, stereolithography, and digital light processing.

3. The method of claim 1, wherein an inner end of each elastically deformable conductive contact is spaced apart from the conductive trace within the base after said step of successively forming.

4. The method of claim 3, wherein the inner end of each elastically deformable conductive contact elastically deforms to contact the conductive trace when an associated one of the plurality of buttons is depressed.

5. The method of claim 1, wherein the plurality of elastically deformable conductive contacts are formed of metal and an elastomer.

6. The method of claim 5, wherein the plurality of buttons are formed of a rigid polymer.

7. The method of claim 1, wherein the graphics of the plurality of buttons are positioned at outer surfaces of the plurality of buttons after said step of successively forming.

8. The method of claim 7, wherein the base includes an outer surface, the outer surfaces of the plurality of buttons positioned such that the outer surfaces of the plurality of buttons are raised from the outer surface of the base after said step of successively forming.

9. The method of claim 1, wherein the unitary control panel does not include an adhesive that fixes the plurality of elastically deformable conductive contacts to the base or that mounts the plurality of buttons to the plurality of elastically deformable conductive contacts after said step of successively forming.

10. The method of claim 1, wherein the plurality of elastically deformable conductive contacts are integrally formed with the base and the plurality of buttons are integrally formed with the plurality of elastically deformable conductive contacts after said step of successively forming.

11. A method for forming a unitary control panel for an appliance, comprising:
    establishing three-dimensional information of a base and a plurality of elastically deformable conductive contacts of the unitary control panel;
    converting the three-dimensional information from said step of establishing into a plurality of slices;

additively constructing each slice of the base of the unitary control panel; and integrally forming, during said step of additively constructing, each slice of the plurality of elastically deformable conductive contacts, each elastically deformable conductive contact having a button with a respective graphic after said step of integrally forming.

12. The method of claim 11, wherein said step of additively constructing comprises constructing each slice of the base of the unitary control panel with at least one of fused deposition modeling, selective laser sintering, stereolithography, and digital light processing.

13. The method of claim 11, wherein an inner end of each elastically deformable conductive contact is spaced apart from a conductive trace positioned within the base after said step of successively integrally forming.

14. The method of claim 13, wherein the inner end of each elastically deformable conductive contact elastically deforms to contact the conductive trace when the button of the elastically deformable conductive contacts is depressed.

15. The method of claim 11, wherein the contacts of the plurality of elastically deformable conductive contacts are formed of metal and an elastomer during said step of integrally forming.

16. The method of claim 15, wherein the button of each contact of the plurality of elastically deformable conductive contacts is formed of a rigid polymer during said step of integrally forming.

17. The method of claim 11, wherein the graphic of the button of each elastically deformable conductive contact is positioned at outer surface of the button after said step of integrally forming.

18. The method of claim 17, wherein the base includes an outer surface, the outer surface of the button of each elastically deformable conductive contact positioned such that the outer surface of the button of each elastically deformable conductive contact is raised from the outer surface of the base after said step of integrally forming.

19. The method of claim 11, wherein the unitary control panel does not include an adhesive that fixes the plurality of elastically deformable conductive contacts to the base or the button to each elastically deformable conductive contact after said steps of additively constructing and integrally forming.

* * * * *